United States Patent
Fischer et al.

(10) Patent No.: US 6,662,506 B2
(45) Date of Patent: Dec. 16, 2003

(54) COLLAPSE-RESISTANT FRAME SYSTEM FOR STRUCTURES

(76) Inventors: Gregor D. Fischer, 2200 Fuller Ct., Ann Arbor, MI (US) 48105; Victor C. Li, 8 Northwick Ct., Ann Arbor, MI (US) 48105

(*) Notice: Subject to any disclaimer, the term of this patent is extended or adjusted under 35 U.S.C. 154(b) by 0 days.

(21) Appl. No.: 09/902,065

(22) Filed: Jul. 10, 2001

(65) Prior Publication Data

US 2002/0002801 A1 Jan. 10, 2002

Related U.S. Application Data

(60) Provisional application No. 60/217,038, filed on Jul. 10, 2000.

(51) Int. Cl.[7] ............................. E04H 9/02; E04B 1/98

(52) U.S. Cl. .................. 52/167.8; 52/1; 52/167.9; 52/653.1; 52/721.4; 52/726.2; 52/726.3; 52/729.2; 52/737.2; 52/737.4; 403/188; 403/189; 403/262

(58) Field of Search ..................... 52/1, 283, 653.1, 52/295, 729.1, 729.2, 731.1, 736.1, 736.2, 737.1, 737.2, 252, 721.1–721.4, 723.1, 726.1, 726.2, 726.3, 730.2, 737.4, 423, 167.1, 167.7, 167.9, 167.8; 403/346, 347, 408.1, 262, 187, 188, 189

(56) References Cited

U.S. PATENT DOCUMENTS

| | | | | |
|---|---|---|---|---|
| 3,593,477 A | * | 7/1971 | Briggs | 52/283 |
| 3,638,377 A | | 2/1972 | Caspe | |
| 3,938,294 A | * | 2/1976 | Gaburri | 52/743 |

(List continued on next page.)

FOREIGN PATENT DOCUMENTS

| | | |
|---|---|---|
| CH | 630 131 | 5/1982 |
| DE | 1 279 918 | 10/1968 |
| EP | 0 448 577 B1 | 11/1993 |
| EP | 0 699 808 A1 | 3/1996 |
| JP | 10-270292 * | 9/1998 |

OTHER PUBLICATIONS

H. Fukuyama, Y. Masuda, Y. Sonobe, and M. Tanigaki, "Structural Performances of Concrete Frame Reinforced with FRP Reinforcement," Non–Metallic (FRP) *Reinforcement for Concrete Structures*, 1995, E & FN Spon, England.

Z. Lin, T. Kanda and V. C. Li, "On Interface Property Characterization and Performance of Fiber–Reinforced Cementitious Composites," *Concrete Science and Engineering*, Sep. 1999, pp. 173–184, vol. 1, Rilem Publications S.A.R.L.

(List continued on next page.)

*Primary Examiner*—Carl D. Friedman
*Assistant Examiner*—Yvonne M. Horton
(74) *Attorney, Agent, or Firm*—Brooks Kushman P.C.

(57) ABSTRACT

A collapse-resistant frame system (10) for a bridge or building structure includes a plurality of mechanically-interconnected columns (12) and beams (14). At least the lowermost columns are formed of a material (28) that exhibits quasi-elastic behavior in response to seismic excitation, while the beams of the frame system are formed of a material (22) that exhibits elastic/plastic behavior, such that quasi-elastic flexure of the columns under seismic loading will cause plastic hinge formation in the beam ends (26) to thereby dissipate the rotational energy without significant plastic hinge formation in the column bases. In a disclosed embodiment, the column material is an engineered cementitious composite (ECC) matrix (30) reinforced with fiber-reinforced plastic (FRP) (32) to thereby provide a relatively-high flexural strength member having a relatively-lower flexural stiffness and higher elastic deformation limit, while the beam material is an ECC matrix reinforced with mild steel rebar (34) to thereby provide a relatively-lower flexural strength member featuring high energy-absorbing capacity.

25 Claims, 2 Drawing Sheets

U.S. PATENT DOCUMENTS

| | | | |
|---|---|---|---|
| 4,407,676 A | | 10/1983 | Restrepo |
| 4,587,773 A | | 5/1986 | Valencia |
| 4,644,714 A | | 2/1987 | Zayas |
| 4,799,339 A | | 1/1989 | Kobori et al. |
| 4,881,350 A | | 11/1989 | Wu |
| 4,883,250 A | | 11/1989 | Yano et al. |
| 4,922,667 A | | 5/1990 | Kobori et al. |
| 5,043,033 A | | 8/1991 | Fyfe |
| 5,148,642 A | * | 9/1992 | Plumier et al. ............ 52/167 R |
| 5,174,080 A | * | 12/1992 | Yoshimura et al. ........... 52/252 |
| 5,218,802 A | * | 6/1993 | Yoshimura et al. ........... 52/253 |
| 5,502,932 A | | 4/1996 | Lu |
| 5,595,040 A | * | 1/1997 | Chen ......................... 52/729.1 |
| 5,660,007 A | | 8/1997 | Hu et al. |
| 5,675,943 A | | 10/1997 | Southworth |
| 5,680,738 A | * | 10/1997 | Allen et al. ................. 52/729.1 |
| 5,983,582 A | | 11/1999 | Vugrek |
| 6,012,256 A | * | 1/2000 | Aschheim .................. 52/167.1 |
| 6,060,163 A | | 5/2000 | Naaman |
| 6,061,992 A | * | 5/2000 | Vincent ..................... 52/721.3 |
| 6,189,286 B1 | | 2/2001 | Seible et al. |
| 6,194,051 B1 | | 2/2001 | Gagas et al. |
| 6,237,303 B1 | * | 5/2001 | Allen et al. ................. 52/729.1 |

OTHER PUBLICATIONS

V. C. Li, "Metal–Like Concrete for Constructed Facilities," PowerPoint presentation presented in Ann Arbor, Michigan, in May, 2000.

V. C. Li and C. Leung, "Steady–State and Multiple Cracking of Short Random Fiber Composites," *Journal of Engineering Mechanics,* Nov. 1992, pp. 2246–2264, vol. 118, No. 11, ASCE.

* cited by examiner

COLLAPSE-RESISTANT FRAME SYSTEM FOR STRUCTURES

CROSS-REFERENCE TO RELATED APPLICATIONS

This application claims the benefit of U.S. provisional application Ser. No. 60/217,038 filed Jul. 10, 2000.

STATEMENT OF GOVERNMENT RIGHTS

The invention was made with support under Grant No. 9601262 awarded by the NFS. The Government has certain rights in this matter.

BACKGROUND OF THE INVENTION

1. Field of the Invention

The invention relates to collapse-resistant frame systems, as may be incorporated in bridge and building structures located in geographic regions likely to experience seismic activity.

2. Background Art

The prior art has recognized the desirability of providing building and bridge structures with collapse-resistant frame systems with self-centering capabilities to thereby reduce the likelihood of a catastrophic failure of such structures and relatively large residual displacements in the event of large seismic excitation. Typically, collapse-resistant building or bridge structures include interconnected columns and beams that are formed of steel or steel-reinforced concrete, whose load-deformation characteristics, for example, as a beam in flexure are generally governed by the material properties of steel or steel reinforcement in a concrete matrix. Because steel/reinforcing steel may be characterized as exhibiting "elastic/plastic" behavior (so-called because of the relatively-low elastic strain capacity of the material, coupled with the material's significant, additional plastic strain capacity at constant load as the material begins to yield plastically), the columns and beams of such known frame systems may likewise be expected to exhibit "elastic/plastic" behavior. Thus, once the elastic strain limit of such columns and beams are exceeded, the behavior of such columns and beams is essentially governed by the rotation of a concentrated region of plastic deformation (the formation of a "plastic hinge"). Thus, as the columns and beams yield plastically in respective regions of maximum stresses (the plastic hinges), the deformation localizes at the plastic hinges and the load can only marginally be increased due to possible strain-hardening of steel in the plastic deformation regime (the column or beam can no longer resist increases in applied load and, hence, continues to plastically deform with applied load until ultimate failure).

The prior art has sought to utilize plastic hinge formation in the beams of such known structures as a mechanism for dissipating seismic energy. However, in a typical building or bridge structure formed of steel or steel-reinforced concrete frame members, a large rotational deformation in particular columns (usually first-floor columns) of the structure in response to seismic excitation is necessary in order to activate the energy-dissipating capacity of the beams through plastic hinge formation. Such large rotational deformation in the columns is achieved through the formation of plastic hinges in the base of the columns (the formation of a plastic hinge becomes apparent in the flexural load-deformation behavior as a constant or only marginally increasing load at increasing plastic deformation). Unfortunately, such plastification of the base of the structure's columns in conjunction with the formation of plastic hinges in adjacent beams may cause a collapse of the structure, even when the structure has been subjected to relatively limited lateral displacement, as confirmed by the collapse of many "soft" first-story frame systems in recent major earthquakes.

Still further, because yielding (in both the columns and the beams) is concentrated at the plastic hinge, the material must be capable of undergoing a large local plastic strain in order to accommodate the targeted displacement) of each frame member, while regions of the frame member outside the plastic hinge essentially remain elastic. In steel-reinforced concrete members, this localization is caused by a combination of the brittle stress-strain behavior of concrete and the elastic/plastic behavior of reinforcing steel. Beyond yielding of reinforcement, this particular section serves as a weak link and deformation (i.e., cracking) cannot be further distributed. The deformation capacity of the frame member is then limited by the localized failure of this weakened section, such as fracture or buckling of steel reinforcement.

In order to achieve a better distribution of strain than available with reinforced-concrete frame members, the prior art has proposed use of frame members made of a fiber-reinforced cementitious material known as ECC (Engineered Cementitious Composite). ECC contains a small volume fraction of polymeric fibers, typically less than about 2% by volume, and shows pseudo-strain hardening behavior accompanied by the formation of multiple cracking. ECC does not break after cracking (like concrete), but can increase its strength while deforming up to 4% strain in tension. In a frame member of steel-reinforced ECC (as opposed to steel-reinforced concrete), the unique properties of ECC result in a distribution of cracking in an extended plastic hinge region and cause a decrease in peak strain demand on the reinforcement. Consequently, steel-reinforced ECC frame elements have a larger deformation capacity than steel-reinforced concrete frame members, and seismic-excitation-induced flexural deformation is more evenly distributed along the member. However, the elastic/plastic material characteristics of the steel reinforcement still govern the load-deformation behavior of steel-reinforced ECC frame members and, hence, the use in a frame system of steel-reinforced ECC columns nonetheless results in deleterious plastic hinge formation at the column base.

Under another prior art approach, a steel-column-and-beam frame system employs weakened beams in order to focus plastic hinge deformation in a select region of each beam, for example, away from the beam-column joints (welds). However, such weakened-beam frame systems nonetheless require plastic hinge formation in the lowermost columns in order to activate energy dissipation through plastic hinge formation in the select region of the beams.

Another known approach is to incorporate mechanical devices and complex response control systems into the structures, which are similar to sophisticated suspension systems of automobiles. Such mechanical devices and control systems are expensive and require major maintenance efforts.

Accordingly, it would be desirable to provide frame systems for building and bridge structures that have improved collapse-resistance and self-centering capabilities after undergoing large deformations relative to known steel and steel-reinforced concrete frame systems.

SUMMARY OF THE INVENTION

Under the invention, a frame system for use, for example, in an earthquake-resistant building or bridge structure, includes a plurality of interconnected beams and columns, wherein the beams are formed of a first material that enables the beams to exhibit an elastic/plastic behavior, and wherein at least the lowermost free-standing columns (those lacking external lateral support, such as the first-story columns of a multi-story building structure, rather than laterally-bolstered sub-ground-level columns) are formed of a second material that enables such columns to exhibit a "quasi-elastic" behavior over a range of flexural deformation sufficient to allow plastic hinge formation in the adjacent beams. For frame systems including a plurality of tiers of beams, such as a multi-story building structure, the columns supporting the upper tiers preferably likewise exhibit quasi-elastic behavior relative to the material of the beams of the lowermost tier. By "quasi-elastic" behavior, it is meant that the behavior is characterized by proportionally increasing resistance to increasing load, notwithstanding the fact that the frame member formed of such material may not return to its exact original shape upon removal of such loads. In this way, the columns remain quasi-elastic and maintain vertical stability and self-centering capabilities of the structure that incorporates a frame system according to the invention, while plastic deformation and energy dissipation are assigned to the formation of plastic hinges in the beams.

Thus, in accordance with a feature of the invention, in the event of a lateral displacement of the upper tiers of the frame system, the quasi-elastic load-deformation behavior of the column material results in initial plastic hinge formation at the beam ends, such that the beams rather than the columns dissipate the structure-deforming energy up to the point where the beam material at the plastic hinges fails, thereby substantially preventing plastic hinge formation in the columns, for example, at the column base. The prevention of plastic hinge formation in the columns provides a substantial improvement in terms of safety while significantly reducing residual deformation and repair needs, even after strong seismic events, by maintaining the load-carrying capacity of the columns and preventing damage to critical column members. Repair costs are also reduced, because plastic deformation is forced into the beams, which can typically be repaired or replaced without interfering with the vertical stability of the entire structure.

While the invention contemplates any suitable material for the columns that provide the intended quasi-elastic behavior, an example of a suitable material is a composite of fiber-reinforced plastic (FRP) and an engineered cementitious composite (ECC) that itself comprises a mixture of cementitious material, and hydrophilic and/or hydrophobic fibers. More specifically, the ECC's cementitious material is any suitable cement material such as conventional cements, or mixtures of conventional cements. Examples of suitable hydrophilic fibers include PVA (polyvinyl alcohol) fibers, EVOH (ethyl vinyl alcohol) fibers, polyvinyl acetate fibers, ethylene vinyl acetate, hydrophilic acrylic fibers, and acrylamide fibers. Examples of suitable hydrophobic fibers include polyethylene (Spectra) and polypropylene fibers. By way of example only, the hydrophilic and/or hydrophobic fibers in the ECC preferably comprise about 0.5 to about 10 volume percent of the ECC, more preferably in an amount of about 1 to about 3 volume percent, and most preferably in an amount of about 1 to about 2 volume percent. Preferably, the FRP reinforces the ECC matrix.

Similarly, while the invention contemplates any suitable material for the beams that provide the intended elastic/plastic behavior, examples of suitable materials for the elastic/plastic beams includes steel, steel-reinforced concrete, steel reinforced FRC (fiber-reinforced concrete), and steel-reinforced ECC.

DETAILED DESCRIPTION OF THE PREFERRED EMBODIMENT

Figure 1:
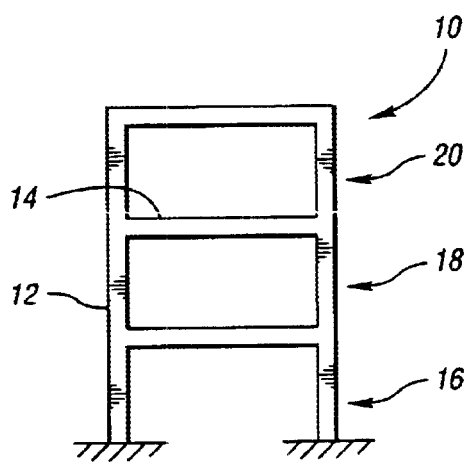
FIG. 1 is an elevational view of an exemplary frame system for a multi-story building structure in accordance with the invention, prior to any lateral displacement of an upper tier of the structure, for example, due to seismic activity.
Figure 2:
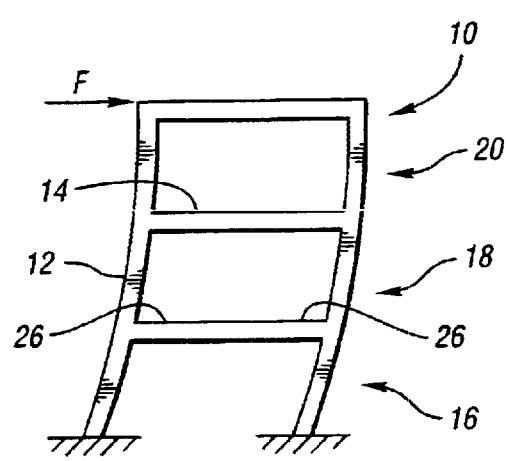
FIG. 2 is an elevational view of the exemplary frame system illustrating lateral displacement of the upper tiers of the structure and the attendant formation of plastic hinges only in the frame system's beams.
Figure 3:
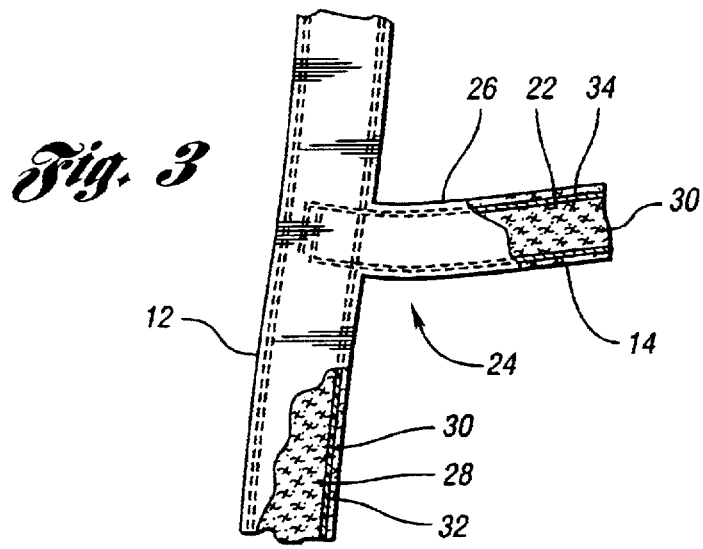
FIG. 3 is an enlarged, partial elevational view, partially-broken away, of the joint formed between a column and beam and columns of the exemplary frame system during plastic hinge deformation in the beam ends.

FIG. 1 is an elevational view of an exemplary frame system 10 in accordance with the invention, while FIG. 2 is an elevational view of the exemplary frame system 10 during application of lateral load F as, for example, may be produced during seismic excitation. The structure 10 includes a plurality of interconnected columns 12 and beams 14 which define a plurality of tiers 16,18,20. In accordance with the invention, as seen in FIG. 3, the beams 14 are formed of a first material 22 that enables the beams 14 to exhibit an elastic/plastic behavior, that is, a material that is capable of energy dissipation through the formation of a plastic hinge 24 at the beam ends 26 once the elastic strain limit of the beam material 22 is exceeded. The columns 12 forming at least the lowermost tier 16 of the exemplary frame system 10 (the location where plastic hinge formation in columns is most common in prior art structures) and, preferably, the columns of the upper tiers 18,20 as well, are formed of a second material 28. The second material 28 enables the columns 12 to exhibit a "quasi-elastic" behavior, that is, a material that responds in a generally "elastic" manner over a range of flexure sufficient to allow plastic hinge formation in the beams once the applied load F exceeds a critical load $F_{crit}$.

Figure 4:
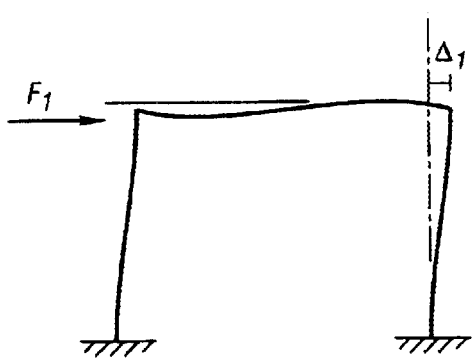
FIG. 4 is a schematic illustration of the idealized deformation behavior of the exemplary frame system in response to a first load $F_1$ that is less than a critical load $F_{crit}$.
Figure 5:
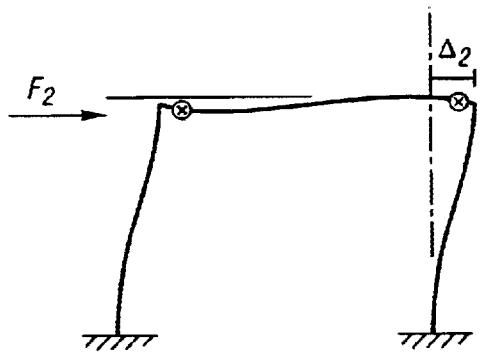
FIG. 5 is a schematic illustration of the idealized deformation behavior of the exemplary frame system in response to a second load $F_2$ that exceeds the critical load $F_{crit}$.
Figure 6:
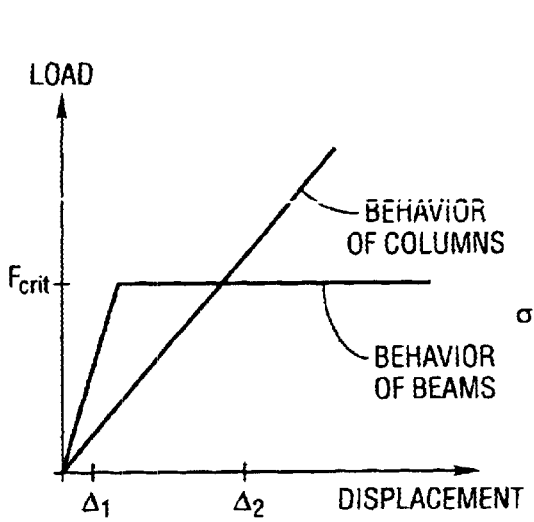
FIG. 6 is a plot of force versus displacement characterizing the idealized deformation behavior of the quasi-elastic columns and elastic/plastic beams used in the exemplary frame system.

In this way, as illustrated in the simplified schematic diagrams of FIGS. 4 and 5, when the exemplary frame system 10 experiences a first load $F_1$ that is less than the critical load $F_{crit}$ to thereby cause a first lateral displacement $\Delta_1$, the columns 12 and beams 14 behave elastically or quasi-elastically, thereby avoiding plastic hinge formation in either the columns or the beams. Upon application of a second load F2 that exceeds the critical load $F_{crit}$ to thereby cause a second lateral displacement $\Delta_2$, the columns 12 continue to behave quasi-elastically (allowing some minor nonreversible structural or materials property change, but without plastic hinge formation characterized by increasing plastic deformation at constant or marginally-increasing load) while the beams 14 yield plastically to form plastic hinges at the beam ends 26. The invention thus seeks to concentrate plastic hinge formation in the beam ends 26 of the beams 14 of the frame system 10, while avoiding the formation of plastic hinges in the columns 12 (as illustrated in FIG. 3). A plot of force versus displacement characterizing the idealized deformation behavior of the quasi-elastic columns 12 and elastic/plastic beams 14 used in the exemplary frame system 10 is illustrated in FIG. 6. As seen in FIG. 6, the beams' flexural stiffness exceeds that of the columns until the critical load $F_{crit}$ is exceeded, whereupon the columns' flexural stiffness exceeds that of the beams (above $F_{crit}$ the flexural stiffness of the beam effectively becomes negligible, because the beam can no longer supply additional resistance to increases in load).

While the invention contemplates use of any suitable combination of beam and column materials 22, 28 whereby the respective elastic/plastic and quasi-elastic behaviors are obtained, in the exemplary frame system 10, the columns 12 of at least the first tier 16 and, preferably, all of the system's columns 12, are formed of a composite of an engineered cementitious composite (ECC) 30 that is reinforced with a fiber-reinforced plastic (FRP) 32.

In a constructed embodiment, the ECC 30 is a mixture of cementitious material and hydrophilic and/or hydrophobic fibers (not shown). The cementitious material of the ECC preferably comprises any suitable set material such as conventional cements or mixtures of conventional cements. Examples of suitable cementitious materials include, but are not necessarily limited to, Type 1 Cement, and Type 3 Cement. The hydrophilic fibers may be one or more of any suitable hydrophilic fibers. Examples of suitable hydrophilic fibers include, but are not limited to, PVA (polyvinyl alcohol) fibers, EVOH (ethyl vinyl alcohol) fibers, polyvinyl acetate fibers, ethylene vinyl acetate and the like. Hydrophilic acrylic and acrylamide fibers may also be used. Suitable hydrophobic fibers, such as polyethylene (Spectra) and polypropylene fibers may be used in addition to, or in place of, the hydrophilic fibers. The fibers are preferably present in the ECC in an amount of about 0.5 to about 10 volume percent, more preferably in an amount of about 1 to about 3 volume percent, and most preferably in an amount of about 1 to about 2 volume percent. Where desired, the fibers may be coated with the oiling agent by any conventional manner such as by tip coating or spraying the fibers.

The FRP 32 suitable for use with the invention comprises all FRPs known to one of ordinary skill in the art to be suitable for reinforcing cement compositions. Examples of suitable FRPs 32 include, without limitation, glass fiber-reinforced plastics, aramid-reinforced plastic, and carbon (graphite)-reinforced plastics. In an exemplary frame system, the FRPs 32 are provided as continuous fibers or rods having a length preferably as long as the respective column or beam, and a diameter of between about 5 and 15 mm. The FRP 32 may have a matrix of thermoplastic material or thermoset material. Examples include polyphenylene sulfide (PPS) thermoplastic, and epoxy resin thermoset plastics. The fibers may be continuous or discontinuous tows (unidirectional), braided tows, and combinations of the foregoing. In an exemplary construction, the amount of FRP 32 in the ECC/FRP composite material 28 of the columns 12 is the same as the amount of FRP 32 when used in connection with reinforcing conventional concrete. The stress-strain curve for an FRP 32 suitable for use with the invention is illustrated in FIG. 7.

As noted above, the beams 14 of the exemplary frame system 10 are formed of a material 22 that exhibits an elastic/plastic behavior. Suitable beam materials 22 include, without limitation, steel, steel-reinforced concrete/FRC (fiber-reinforced concrete), and, as used in the exemplary frame system 10, steel-reinforced ECC. The stress-strain curve for mild steel rebar 34 suitable for use with an ECC 30 matrix in accordance with the invention is also illustrated in FIG. 7, and is seen to provide the beams 14 with a higher flexural stiffness than that of the columns 12 up to the beam material's yield stress $F_{yield}$. The beams 14 are similarly provided with a higher modulus of elasticity than that of the FRP-reinforced columns 12 up to the beam material's yield stress $F_{yield}$.

When the stress induced in the beam ends 26 exceeds the beam material's yield stress $F_{yield}$, the beam deforms plastically at negligible flexural stiffness while the column material 28 continues to perform elastically at its relatively-higher flexural stiffness and significantly-higher ultimate strength compared to the beam 14. Recalling the characteristic elastic/plastic stress-strain behavior of steel, the steel-reinforced ECC beams 14 of the exemplary frame system 10 thus have a limited elastic strain capacity of about 0.2%, followed by a plastic strain capacity of up to about 25%.

Figure 7:
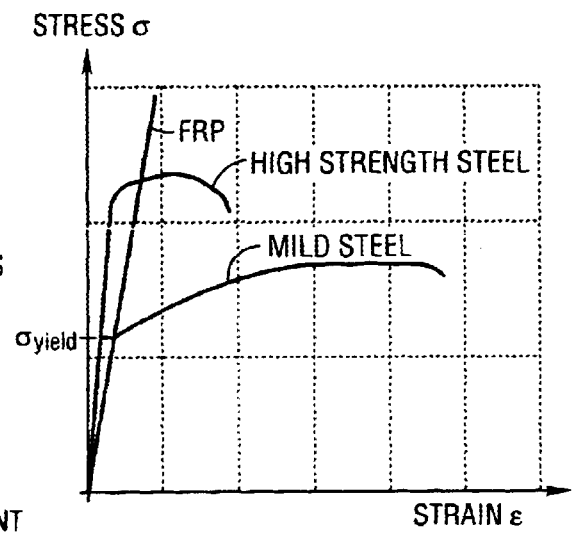
FIG. 7 is a plot of stress versus strain for two suitable column reinforcement materials (FRP and high-strength steel), for use in combination with a suitable beam reinforcement material (mild steel)

By way of a further example as to a suitable reinforcement material for the ECC matrix 30 of the columns 12, for use in combination with the mild-steel reinforced beams 14, FIG. 7 also shows a stress-strain curve for high-strength steel rebar that, if substituted for the FRP 32 in the columns 12 of the exemplary frame system 10, would similarly enable the columns 12 to exhibit a "quasi-elastic" behavior over a range of flexural deformation sufficient to allow plastic hinge formation in the adjacent beams 14, due to the high-strength steel's greater elastic strain limit when compared to that of mild steel.

Figure 8:
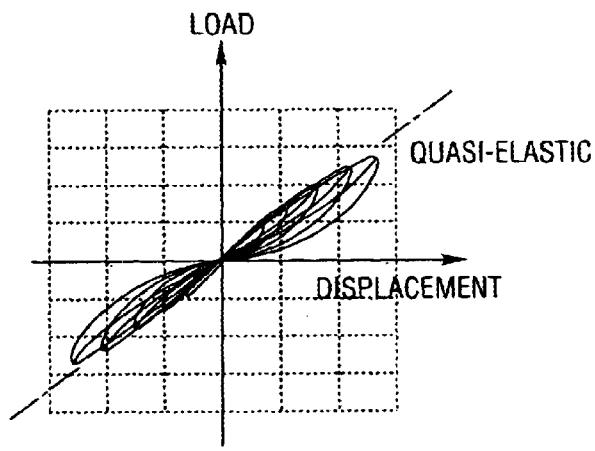
FIGS. 8 and 9 are illustrations of the theoretical bi-linear load-deformation responses of the first-tier quasi-elastic (FRP/ECC) columns and elastic/plastic (steel/ECC) beams of a constructed one-story frame system in accordance with the invention.
Figure 9:
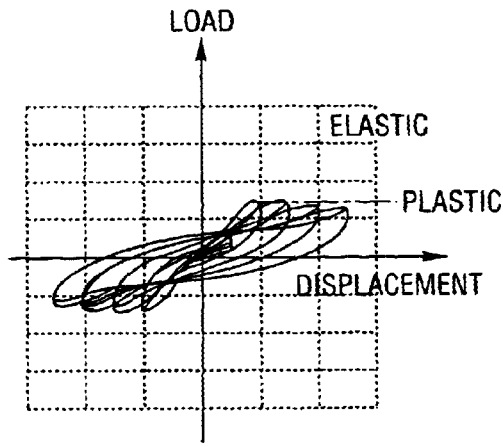

The theoretical bi-linear load-deformation responses of the first-tier quasi-elastic (FRP/ECC) columns 12 and elastic/plastic (steel/ECC) beams 14 of a constructed one-story frame system in accordance with the invention; are illustrated in FIGS. 8 and 9, respectively.

The functionality of the proposed innovation has been experimentally verified with several one-story one-bay frame specimens (not shown) comprised of homogeneously-cast, FRP-reinforced ECC columns and steel-reinforced ECC beams having a similar structure to a frame system schematically illustrated in FIGS. 4 and 5.

SPECIMEN 1

Columns: AFRP (Aramid) reinforcement (Ø8 mm) (ultimate strength: 1800 MPa, ultimate strain: 3.4%)
Beam: Steel reinforcement (Ø6 mm) (yield strength: 420 MPa, yield strain: 0.2%) (ultimate strength: 620 MPa, ultimate strain: 20%)

SPECIMEN 2

Columns: CFRP (Carbon) reinforcement (Ø8 mm) (ultimate strength: 1800 MPa, ult. strain: 1.8%)

Beam: Steel reinforcement (Ø6 mm) (yield strength: 420 MPa, yield strain: 0.2%) (ultimate strength: 620 MPa, ultimate strain: 20%)

When subjected to fully-reverse, cyclic loading, with no axial load applied at columns (initial loading cycle and repeat loading cycle (0% to 5% drift)), both specimens behaved in accordance with the invention. Prior to yielding of the beam ($F<F_{crit}$), the columns accommodated most of the lateral displacement, and a quasi-elastic double curvature deflection is achieved (with the formation of minor cracking of the ECC matrix). When the load was increased to effect yielding in the beam, increased crack formation was observed in the beam element, particularly in the plastic hinges at both ends of the beam. When the plastic moment capacity in the beam was reached, the specimens demonstrated minor cracking in the column elements concentrated in the column base, with a few cracks also being formed at the top of the column.

After incremental cyclic displacement up to 5% lateral drift, the frame was reloaded in the same incremental procedure and maintained its load-carrying capacity. However, due to the stiffening effect of the ECC matrix, the initial response of the frame could not be fully recovered, since cracking and opening of the cracks in the matrix is irreversible damage and cannot be restored. In Specimen 2, the increased stiffness of the CFRP reinforcement caused an increased deformation in the beam plastic hinges at comparable frame displacements and therefore dissipated more energy as compared to Specimen 1.

As noted above, the implementation of this invention will be most effective in the first tier 16 of a multi-tier frame system 10, as best seen in FIG. 1, where relatively large deformations are necessary in order to activate the formation of plastic hinges 24 in the beams 14 of the upper tiers 18, 20. Other columns 12 except in the first tier 16 can be made of steel, steel-reinforced concrete, or steel-reinforced ECC, depending on the particular design concept. It is also possible to provide the proposed collapse-resistant configuration in the entire structural frame to eliminate the possibility of collapse in levels above the first tier 16.

Figure 10:
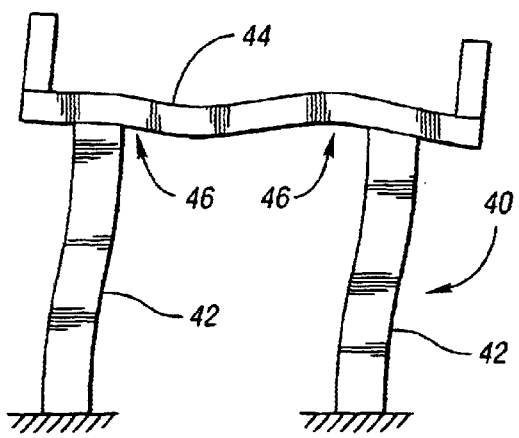
FIG. 10 is a cross-sectional view of a bridge structure, employing a single-story frame system in accordance with the invention, during plastic hinge formation in the structure's beam.

The proposed configuration can also be implemented in bridge structures, which commonly consist of a single-story frame system 40, as illustrated in FIG. 10, such that the columns 42 behave quasi-elastically to allow the beam 44 to dissipate seismic energy through the formation of plastic hinges 46.

The quasi-elastic load-deformation behavior of frame systems constructed in accordance with the invention provides sufficient deformation capacity in order to form plastic hinges at the beam ends and dissipate energy while at the same time prevents the formation of plastic hinges at the column base. Thus, the invention can be beneficially used to design collapse-resistant structures, such as buildings and infrastructure, leading to major improvements in safety. Moreover, the invention offers significant reductions in the repair needs of such structures, even after strong seismic events, by maintaining the structure's vertical-load-carrying capacity, providing self-centering capabilities and reducing damage in critical column members. Repair-needing damage is advantageously forced into the structure's beams which can be repaired or replaced without interfering with the vertical stability of the entire structure.

In accordance with another feature of the invention, the use of reinforced ECC provides the columns and beams of the exemplary frame system 10 with a redundancy of transverse reinforcement. Specifically, because of the tensile strength of reinforced ECC at large strain magnitudes, the demand on the columns 12 and beams 14 in terms of shear resistance is sufficiently provided by the ECC matrix. Accordingly, the use in the exemplary frame system 10 of columns 12 and beams 14 made of reinforced ECC greatly simplifies construction by eliminating the need for the transverse reinforcement (e.g., stirrups) typical of reinforced concrete structures in order to maintain flexural ductility of the columns 12.

The invention is beneficially expected to reduce construction and life cycle cost of such buildings and infrastructure significantly. The invention offers a moment-resisting frame system with intrinsic collapse-prevention capabilities and auto-adaptive response and self-centering characteristics. The implementation of this system is expected to significantly reduce construction cost as well as life-cycle cost of building structures and infrastructure facilities.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, while all of the beams 14 of the exemplary frame system 10 are formed of a material that exhibits elastic/plastic behavior to thereby permit energy dissipation though plastic hinge formation in the respective ends of each beam 14, the invention contemplates forming at least some of the beams, for example, of the uppermost 20 of the frame system 10 of a material that behaves quasi-elastically, whereby energy dissipation is effected through plastic hinge formation in the elastic/plastic beams 14 of the lower tiers 16, 18 will likely avoiding damage to the quasi-elastic beams 14 of the uppermost tier 20.

What is claimed is:

1. In a frame system for use in a building or bridge structure having a plurality of interconnected beams and columns, the improvement wherein the beams are formed of a first material that enables the beams to exhibit an elastic/plastic behavior, and the columns are formed of a second material that enables the columns to exhibit quasi-elastic behavior over a range of flexural deformation sufficient to allow plastic hinge formation in at least one of the beams and prevent plastic hinge formation in the columns.

2. The frame system of claim 1, wherein the first material has a lower elastic strain limit than the second material, and wherein the second material has a higher ultimate strength than the first material.

3. The frame system of claim 2, wherein the first material has a higher modulus of elasticity than the second material.

4. The frame system of claim 1, wherein the first material includes mild steel.

5. The frame system of claim 4, wherein the first material includes a matrix reinforced with mild steel.

6. The frame system of claim 1, wherein the first material includes a first engineered cementitious composite comprising cementitious material and at least one of hydrophilic and hydrophobic fibers.

7. The frame system of claim 1, wherein the second material includes a second engineered cementitious composite comprising cementitious material and at least one of hydrophilic and hydrophobic fibers.

8. The frame system of claim 7, wherein the column further includes a reinforcement lattice within the second engineered cementitious composite, the lattice being formed of a third material having a higher elastic strain limit than the first material.

9. The frame system of claim 8, wherein the third material of the lattice is one of the group consisting of a fiber-reinforced plastic and a high-strength steel.

10. A collapse-resistant frame system comprising:
a plurality of interconnected columns and beams, wherein at least one beam is formed of a first material that enables the one beam to exhibit elastic behavior in response to a first load and plastic behavior in response to a second load exceeding the first load, and wherein at least one column is formed of a material that enables the at least one column to exhibit a quasi-elastic behavior and prevent plastic hinge formation in the at least one column in response to the second load.

11. The frame system of claim 10, wherein the first material has a lower elastic strain limit than the second material, and wherein the second material has a higher ultimate strength than the first material.

12. The frame system of claim 11, wherein the first material has a higher modulus of elasticity than the second material.

13. The frame system of claim 10, wherein the first material includes mild steel.

14. The frame system of claim 13, wherein the first material includes a matrix reinforced with mild steel.

15. The frame system of claim 10, wherein the first material includes a first engineered cementitious composite comprising cementitious material and at least one of hydrophilic and hydrophobic fibers.

16. The frame system of claim 10, wherein the second material includes a second engineered cementitious composite comprising cementitious material and at least one of hydrophilic and hydrophobic fibers.

17. The frame system of claim 16, wherein the column further includes a reinforcement lattice within the second engineered cementitious composite, the lattice being formed of a third material having a higher elastic strain limit than the first material.

18. The frame system of claim 17, wherein the third material of the lattice is one of the group consisting of a fiber-reinforced plastic and a high-strength steel.

19. A collapse-resistant frame system comprising:
a plurality of interconnected columns and beams, the beams being formed of a first material having a first elastic strain limit and a first yield strength, and the columns being formed of a second material having a second elastic strain limit higher than the first elastic strain limit and a second yield or ultimate strength greater than the first yield strength, such that an applied load generating a deformation in at least one of the beams that exceeds the elastic deformation limit does not generate a deformation exceeding the second elastic deformation limit and prevents plastic hinge formation in at least one of the columns.

20. The frame system of claim 19, wherein the first material includes mild steel.

21. The frame system of claim 19, wherein the first material includes a first engineered cementitious composite comprising cementitious material and at least one of hydrophilic and hydrophobic fibers.

22. The frame system of claim 21, including mild steel reinforcing the first engineered cementitious composite.

23. The frame system of claim 19, wherein the second material includes a second engineered cementitious composite comprising cementitious material and at least one of hydrophilic and hydrophobic fibers.

24. The frame system of claim 23, wherein the column further includes a reinforcement lattice within the second engineered cementitious composite, the lattice being formed of a third material having a higher elastic strain limit than the first material.

25. The frame system of claim 24, wherein the third material of the lattice is one of the group consisting of a fiber-reinforced plastic and a high-strength steel.

* * * * *